(12) United States Patent
Zhu et al.

(10) Patent No.: US 12,545,773 B2
(45) Date of Patent: Feb. 10, 2026

(54) EXPANDED POLYPROPYLENE BEAD AND PREPARATION METHOD THEREFOR, AND MOLDED PART

(71) Applicant: Wuxi Hi-Tec Environmental Material Co., Ltd, Wuxi (CN)

(72) Inventors: Min Zhu, Wuxi (CN); Haorui Gao, Wuxi (CN); Jia Zeng, Wuxi (CN); Huanhuan Liu, Wuxi (CN); Fanhui Jiang, Wuxi (CN); Ruoxu He, Wuxi (CN); Yezhi Xiong, Wuxi (CN); Liangjiong Yang, Wuxi (CN)

(73) Assignee: WUXI HI-TEC ENVIRONMENTAL MATERIAL CO., LTD, Wuxi (CN)

( * ) Notice: Subject to any disclaimer, the term of this patent is extended or adjusted under 35 U.S.C. 154(b) by 677 days.

(21) Appl. No.: 17/973,178

(22) Filed: Oct. 25, 2022

(65) Prior Publication Data

US 2023/0133048 A1 May 4, 2023

(30) Foreign Application Priority Data

Nov. 2, 2021 (CN) .......................... 202111287859.1
May 6, 2022 (CN) .......................... 202210489731.1

(51) Int. Cl.
*C08J 9/16* (2006.01)
*C08J 9/00* (2006.01)
*C08J 9/228* (2006.01)

(52) U.S. Cl.
CPC ............ *C08J 9/0061* (2013.01); *C08J 9/0066* (2013.01); *C08J 9/16* (2013.01); *C08J 9/228* (2013.01); *C08J 2323/12* (2013.01)

(58) Field of Classification Search
CPC . C08J 9/0061; C08J 9/0066; C08J 9/16; C08J 9/228; C08J 2323/12; C08J 2203/06;
(Continued)

(56) References Cited

U.S. PATENT DOCUMENTS

| 7,259,189 B2 | 8/2007 | Hashimoto et al. |
| 2009/0169895 A1* | 7/2009 | Nohara .................. C08J 9/0061 428/407 |

(Continued)

FOREIGN PATENT DOCUMENTS

| CN | 113308017 A | * | 8/2021 | ............. C08J 9/228 |
| CN | 113956530 A | | 1/2022 | |

(Continued)

OTHER PUBLICATIONS

Office Action dated Mar. 11, 2023 in connection with Chinese patent application No. 202210489731.1, 14 pages including English translation.

*Primary Examiner* — K. Boyle
(74) *Attorney, Agent, or Firm* — Dorsey & Whitney LLP (57) ABSTRACT

Expanded polypropylene beads are prepared from composite particles using a high-temperature and high-pressure kettle type foaming method. The composite particles include a core layer and a skin layer. The core layer includes one or more of the following components, for example in percentage by mass: 20-40% of polypropylene A, 60-80% of polypropylene B, 0-20% of polypropylene C and 0-10% of a thermal-conductive additive. The skin layer includes one or more of the following components, for example in percentage by mass: 40-80% of polypropylene D and 20-60% of polypropylene E. The composite particles are of a multi-layer structure with the skin layer covering the core layer. A resin of the skin layer is easy to sinter at low temperature and in compatibility with a main substrate resin of the core layer. The core layer resin adopts a selected mixture, which promotes molding expansibility.

18 Claims, 1 Drawing Sheet

(58) Field of Classification Search
CPC .. C08J 2423/12; C08J 2427/18; C08J 9/0095; C08J 9/18; C08J 9/122; C08J 9/232; C08J 9/34; C08J 2423/08; Y02P 20/10
See application file for complete search history.

(56) References Cited

U.S. PATENT DOCUMENTS

2010/0137466 A1    6/2010  Sasaki et al.
2012/0100376 A1*  4/2012  Sakaguchi ............ C08J 9/0061
                                                                                      428/407

FOREIGN PATENT DOCUMENTS

| JP | 5107692 B2 | 10/2012 |
| WO | 0202479 A1 | 1/2002 |
| WO | 2021182008 A1 | 9/2021 |

\* cited by examiner

EXPANDED POLYPROPYLENE BEAD AND PREPARATION METHOD THEREFOR, AND MOLDED PART

CROSS-REFERENCE TO RELATED APPLICATIONS

This application claims priority to Chinese Patent Application No. ZL 202111287859.1, filed Nov. 2, 2021, and to Chinese Patent Application NO. ZL 202210489731.1, filed May 6, 2022, each of which is incorporated by reference herein, in the entirety and for all purposes.

FIELD

The present invention relates to an expanded polypropylene bead and a molded part, in particular a low molding pressure molded part, prepared from the expanded polypropylene bead.

BACKGROUND

Polyfoam is widely applied to our daily life due to its characteristics of light weight and high liquidity. Due to the characteristics of high strength, good mechanical performance, excellent temperature resistance, no toxicity, green and recyclability, expanded polypropylene (EPP) is widely applied to various fields, especially expansion in the automobile industry, packaging industry and civil field, so that the market of EPP is unlimited.

The production of an EPP part needs to be carried out in a steam molding manner, and the process needs to consume a large amount of steam (characterized by molding pressure) to increase the temperature of a mold so as to maintain the expansion (secondary foaming) of EPP, so that the required EPP part is obtained after molecular chain migration occurs on the surfaces of beads and a uniform fused body is formed. At a time of increasing energy shortage, if the amount of steam required by EPP molding can be reduced, and the molding pressure of EPP can be reduced, it will not only reduce the production cost of EPP molding, but also play a very important role in reduction of resource consumption, environmental protection and even energy conservation and emission reduction of the whole society. With the problem of energy consumption, special molding equipment is also a stumbling stone on the development road of EPP molding, and if the EPP molding process can be transferred to EPS equipment for production, its market will be more diversified.

There is a wide range of research on reports about reducing energy consumption of EPP bead molding, and through the research content, EPP products which are low in energy consumption and applicable to EPS equipment can be obtained indeed. For example, Patent Document 1 shows a method for modifying molding energy consumption of expanded polypropylene beads by peroxide, which uses a manner of blending and modifying non-crosslinked polypropylene and the peroxide, to induce crystallization in polypropylene units through the decomposition of the peroxide at high temperature (lower than the melting point of polypropylene), improving the strength of polypropylene while providing foaming nucleation points to obtain EPP products with a required magnification. However, such method has obvious defects that firstly, the decomposition of the peroxide has an unstable half-life period, and the influence of temperature on the peroxide is very obvious and uncontrollable; thus, the method is not applicable to industrial production of foaming of EPP.

In addition, Patent Document 2 proposes that a low-temperature enthalpy value in a DSC curve of an EPP bead is increased by blending two/three components, so that the EPP bead has a wider molding window. According to the patent design, low-melting-point polypropylene and high-melting-point polypropylene are blended, wherein the difference between melting points of the low-melting-point polypropylene and the high-melting-point polypropylene is 5-15 DEG C, the low-melting-point component accounts for 50-80%, the high-melting-point component accounts for 50-20%, and the molding pressure can be obviously reduced while the obtained EPP bead has good expansibility in the molding process. According to the method, the low-melting-point polypropylene is the main component, and compared with conventional EPP, the obtained EPP bead has obvious shortcomings in overall mechanical properties.

As described in Patent Document 3, an enthalpy value of a skin layer of an EPP bead is reduced by means of surface modification with peroxide (peroxide is used as a dispersing agent during foaming), thereby reducing steam energy consumption required for molding. According to the method, only the melting point of the skin of EPP is changed, the overall expansibility of EPP is not improved; thus, the method is not applicable to high-softening-point polypropylene raw materials, and has obvious limitation on the reduction of steam energy consumption during molding. Moreover, the peroxide in wastewater is not easy to recycle, which is potentially harmful to the environment.

On the other hand, Patent Document 4 relates to a multi-layer expanded polypropylene bead, the coating thickness on the surface of the bead being controlled through the coating of different low-melting polypropylene skin layers, so that the product has lower molding pressure without affecting comprehensive mechanical properties. However, although such method can well reduce the energy consumption of polypropylene molding, the effect of such simple coating operation is not ideal for high-melting-point polypropylene materials and cannot be applied to all expanded polypropylene materials. Similarly, according to Patent Document 5, it involves using crystalline polyethylene as a skin layer of a foamed particle, which can greatly reduce the molding pressure of a product, but has great hidden dangers in a preparation process: 1, polyethylene and polypropylene are poor in compatibility, the polyethylene skin layer is easily stripped from a polypropylene core layer in a foaming process, which affects the molding effect; and 2, when single polyethylene is used as the skin layer, the fusing strength between beads will be affected during molding, and non-fusion may occur in extreme cases, making the product crisp, and reducing the use strength of a molded part made of the products.

CITATION LIST

Patent Document 1: WO200202479A3;
Patent Document 2: JP5107692B2;
Patent Document 3: US7259189B2;
Patent Document 4: US20120100376A1;
Patent Document 5: WO2021182008A1.

Therefore, it is necessary to develop EPP beads with low molding pressure and simultaneously having high degree of curing and high mechanical strength.

SUMMARY

In order to solve the aforementioned problems, the present application discloses an expanded polypropylene bead and a preparation method therefor, and a molded part. The purpose of the present invention is to provide the EPP bead, which has low molding pressure and high compression strength without special treatment, and can be completely applied to common EPS equipment. Moreover, the EPP bead can well solve the limitation on raw materials when a coating technology is used to produce the low-energy-consumption EPP bead on the market, and is applicable to solving the problem of molding expansibility of high-melting-point and high-modulus polypropylene raw materials, so that a high degree of fusion and high product appearance quality can be obtained under lower molding pressure, and the problems described in the aforementioned patents that under the low molding pressure, although the product is fused, the surface quality is poor, and many pinhole pits exist are solved. The product is applicable to all expanded polypropylene raw materials, and has good molding expansibility so as to ensure that the product can be fully fused during molding under the low molding pressure. In addition, the prepared EPP bead has relatively good mechanical properties and heat-resistant stability.

BRIEF DESCRIPTION OF THE DRAWING

The present invention will be further described in detail below in combination with the accompanying drawing and embodiments.

DETAILED DESCRIPTION

The present invention will now be further described in detail in combination with the embodiments.

In order to achieve the aforementioned purpose, the present invention adopts the technical solution as follows:

An expanded polypropylene bead includes a foamed core layer and a foamed skin layer, the foamed skin layer covering the core layer, wherein the core layer at least includes the following components in percentage by mass: 20-40% of polypropylene A, 60-80% of polypropylene B, 0-20% of polypropylene C and 0-10% of a thermal-conductive additive, and the foamed skin layer includes the following components in percentage by mass: 40-80% of polypropylene D and 20-60% of polypropylene E.

According to an embodiment of the present invention, the weight ratio of the foamed skin layer to the core layer is 1:99-10:90. In some embodiments, the weight ratio of the foamed skin layer to the core layer is 1:99, 2:98, 3:97, 4:96, 5:95 or 10:90.

According to an embodiment of the present invention, the polypropylene A has a melting point of 120-130 DEG C (e.g., 122 DEG C, 124 DEG C, 126 DEG C, 128 DEG C, 130 DEG C or a range formed by any two thereof), a melt index of 5-10 g/10 min (e.g., 5 g/10 min, 6 g/10 min, 7 g/10 min, 8 g/10 min, 9 g/10 min, 10 g/10 min or a range formed by any two thereof), and a flexural modulus of 600-800 MPa or 600-750 MPa (e.g., 600 MPa, 650 MPa, 700 MPa, 750 MPa or a range formed by any two thereof). According to an embodiment of the present invention, the polypropylene A is further preferably a polypropylene random copolymer, and most preferably a metallocene catalyst product which does not include a crystallization nucleating agent, an inorganic filler and a metal salt lubricant. By virtue of a special metallocene catalytic system, the polypropylene has the characteristics of narrow molecular weight distribution and short fusion range. When the expanded polypropylene bead prepared from a blend of metallocene and polypropylene is subjected to heating during steam compression molding, part of crystalline regions are rapidly molten, and the expanded bead shows good expansibility. Due to the good expansibility, the attaching area between adjacent beads can be increased, so that a molded part is excellent in fusion, high in degree of curing and full in surface.

According to an embodiment of the present invention, the polypropylene B has a melting point of 132-148 DEG C (e.g., 132 DEG C, 134 DEG C, 136 DEG C, 138 DEG C, 140 DEG C or a range formed by any two thereof), and a melt index of 5-10 g/10 min (e.g., 5 g/10 min, 6 g/10 min, 7 g/10 min, 8 g/10 min, 9 g/10 min, 10 g/10 min or a range formed by any two thereof). According to an embodiment of the present invention, the polypropylene of the core layer has a molecular weight distribution index of 4-6. When the molecular weight distribution is lower than 4, due to macromolecular polypropylene and entanglement of the polypropylene, the foamed particle has a risk of reduced adhesion fastness during sintering. When the molecular weight distribution is greater than 6, due to the presence of more molecular chains with medium molecular weight in the material, the gas coating capacity of the material is weakened, the particle has more open pore structures, and finally the particle is prone to surface collapse during sintering. According to an embodiment of the present invention, the polypropylene B is further preferably a random co-polypropylene having a flexural modulus of 850 to 1100 MPa.

According to an embodiment of the present invention, the polypropylene C has a melting point of 140-152 DEG C (e.g., 140 DEG C, 142 DEG C, 144 DEG C, 146 DEG C, 148 DEG C, 150 DEG C, 152 DEG C or a range formed by any two thereof), a melt index of 5-30 g/10 min (e.g., 5 g/10 min, 6 g/10 min, 7 g/10 min, 8 g/10 min, 9 g/10 min, 10 g/10 min, 12 g/10 min, 14 g/10 min, 16 g/10 min, 18 g/10 min, 20 g/10 min, 24 g/10 min, 26 g/10 min, 28 g/10 min, 30 g/10 min or a range formed by any two thereof), and is preferably polypropylene having a flexural modulus of 1200 MPa-1400 MPa (e.g., 1200 MPa, 1250 MPa, 1300 MPa, 1350 MPa, 1400 MPa or a range formed by any two thereof). The polypropylene C mainly provides excellent mechanical strength and rigidity for the material, which not only can make up for the loss of mechanical properties caused by blending of low-modulus metallocene polypropylene, but also can provide good high-temperature resistance in high-temperature-resistant application scenes.

According to an embodiment of the present invention, the polypropylene D is co-polypropylene, having a melting point of 105-135 DEG C (e.g., 105 DEG C, 110 DEG C, 115 DEG C, 120 DEG C, 125 DEG C, 130 DEG C, 135 DEG C or a range formed by any two thereof), preferably 120 DEG C-135 DEG C, and a melt index of 4 g/10 min-15 g/10 min (e.g., 5 g/10 min, 6 g/10 min, 7 g/10 min, 8 g/10 min, 9 g/10 min, 10 g/10 min, 12 g/10 min, 14 g/10 min or a range formed by any two thereof). During a molding process, when low steam pressure acts on the expanded polypropylene bead, the low-melting-point polypropylene D is melted rapidly at low temperature, but the high-melting-point polypropylene of the core layer is not melted, so that pore structures are kept. During a subsequent cooling process, through rapid cooling of a polypropylene D resin of the skin layer, the beads are fused with one another, obtaining the molded part. However, it should be noted that the melting point of the composite resin of the skin layer cannot be too low (not lower than 105 DEG C), otherwise, the resin of the skin layer is easy to melt too fast to form a closed layer, and steam heat is prevented from fully entering the interiors of the expanded polypropylene beads, causing the problem that the interior of a product is half-cured and the degree of curing is low.

Preferably, comonomers of the co-polypropylene are ethylene, butylene, preferably a polypropylene-butylene copolymer. As the polypropylene-butylene copolymer is adopted, the random copolymer has a relatively low melting point and a relatively low softening point, and meanwhile, the random copolymer can maintain good flexural modulus.

According to an embodiment of the present invention, the polypropylene E is one or more of LLDPE, LDPE, HDPE, POP, OBC, EVA, POE, EAA and EMA, having a melting point of 90-135 DEG C (e.g., 95 DEG C, 100 DEG C, 105 DEG C, 110 DEG C, 115 DEG C, 120 DEG C, 125 DEG C, 130 DEG C, 135 DEG C or a range formed by any two thereof), preferably 105 DEG C-120 DEG C, and a melt index of 4 g/10 min-15 g/10 min (e.g., 5 g/10 min, 6 g/10 min, 7 g/10 min, 8 g/10 min, 9 g/10 min, 10 g/10 min, 12 g/10 min, 14 g/10 min or a range formed by any two thereof). Preferably, the polyolefin E may be a low-crystallinity polyolefin resin having a crystallinity of 10-30%, such as Tafmer XM elastomer series of Mitsui Chemical Company, Widmet elastomer series of ExxonMobil Chemical Company, VERSIFY elastomer series of Dow Chemical Company, and the like. The low-crystallinity resin can be melted instantly under the action of steam during molding, so that good fusion between the expanded beads is ensured, and the degree of curing of the molded part is further improved. On the other hand, the crystallinity of the polyolefin E cannot be too low, otherwise, after molding and cooling, molecular chains in the resin of the skin layer are prone to incomplete entanglement and weak entanglement force, causing the problem that the part is crispy.

According to an embodiment of the present invention, the thermal-conductive additive is one or more of metal nanorods, carbon nanotubes, graphene, aluminum oxide, silicon oxide, magnesium oxide and zinc oxide, and the particle size is preferably 20 microns-50 microns. According to an embodiment of the present invention, the addition amount of the thermal-conductive additive is preferably 0.5 wt %-5 wt %. The thermal-conductive additive represented by the nanorods, carbon nanotubes or graphene does not generate heat, but a unique planar two-dimensional structure thereof can effectively transfer steam heat energy during a molding process to the expanded polypropylene bead; the thermal-conductive additive represented by aluminum oxide, calcium oxide or other metal oxides is subjected to a chemical reaction under the action of water vapor to generate hydroxide, and meanwhile, a large amount of heat is released, so that further fusion of the expanded polypropylene beads is promoted, and the degree of curing of the part is improved.

According to an embodiment of the present invention, the foamed core layer further includes an expansion additive, preferably one or more of polyvinyl alcohol, polyethylene glycol and aluminum potassium sulfate. According to an embodiment of the present invention, the addition amount of the expansion additive is preferably 0.05 wt %-2 wt %. The expansion additive is a hydrophilic substance and can assist the expanded polypropylene beads to better absorb water vapor during compression molding, so that further expansion of the beads is promoted, the attaching area between the beads is increased, and the degree of fusion of the part is increased.

According to an embodiment of the invention, the foamed core layer further includes a pore nucleating agent. The pore nucleating agent is preferably one or more of polytetrafluoroethylene powder, zinc borate, talcum powder, barium sulfate, calcium carbonate, calcium stearate and silicon dioxide. According to an embodiment of the present invention, the particle size of the pore nucleating agent is preferably 5 microns-15 microns. According to an embodiment of the present invention, the addition amount of the pore nucleating agent is preferably 0.02 wt %-0.2 wt %. The nucleating agent needs to have certain incompatibility with a polypropylene substrate, so that the growth of pores at the junction of the nucleating agent and the polypropylene is promoted, and the heterogeneous nucleating effect is achieved. Meanwhile, the nucleating agent has the effects of reducing foaming pressure and homogenizing pores. In addition, the size of the nucleating agent should be selected appropriately, preferably 10-15 microns. If the particle size of the nucleating agent is too large, the phenomenon of non-uniform pores or broken pores is easily caused; and if the particle size is too small, the overall pore size of the expanded bead is reduced, and the pressure of the bead is released quickly; thus, the surface of the molded part is uneven and is prone to shrinkage.

The product of the present invention is composite expanded polypropylene, of which the components of the skin layer are particularly preferred, and the skin layer has relatively good sintering performance at extremely low molding temperature, so that a molding machine with a low mold locking force can be used to produce a foamed polypropylene part, and meanwhile, the product has relatively high mechanical properties due to high degree of curing. Secondly, the materials of the skin layer have certain crystallization performance and crystallization rate, so that the part with high degree of curing can be easily produced in a sintering process. Thus, considering sintering characteristics of the bead, specific polypropylene materials and other polyolefin materials are selected as the materials of the skin layer to be combined.

Preferably, the skin layer accounts for 3-8% of the total mass of composite particles. The length of the composite particles is 1.2 to 2.5 mm, preferably 1.5 to 2.4 mm, and the weight of the single composite particle is 0.5-1.8 mg, preferably 0.8-1.5 mg.

For functionalization in use, the product can be added with functionalized characteristic substances as required, including an antistatic agent, a flame retardant, color master batch, an antioxidant, a conductive agent, a thermal aging agent, etc.

The antistatic agent is preferably an amide-based substance having certain compatibility with polypropylene, such as Kao TS series including 6B, 8B, 15B and the like, and the addition amount is 1 wt % to 2 wt % as required. When the addition amount is lower than 1 wt %, the antistatic agent is unstable in surface resistance and long in precipitation time; and when the addition amount is greater than 2 wt %, the particles are difficult to sinter due to the large amount of the antistatic agent.

A bromine-antimony-series flame retardant, a phosphorus-nitrogen-series flame retardant, a phosphorus-series flame retardant or the like can be added as required, the phosphorus-nitrogen-series flame retardant or the phosphorus-series flame retardant is preferably selected. As the flame retardant, the hydrophilicity of the flame retardant needs to be particularly considered, a hydrophobic flame retardant is preferred. Since the addition amount of the flame retardant is large, the addition of hydrophilic substances will greatly affect pore structures and a closed pore rate, so that the hydrophobic flame retardant is preferred, and the addition amount is 0.05 wt %-0.2 wt %. When the addition amount of the flame retardants is low, the flame retardation cannot meet the requirement; and when the addition amount of the flame retardants is greater than 0.2 wt %, although the flame retardation performance is excellent, the organic flame retardant has certain mobility, and thus the beads are difficult to sinter.

Preferably, the color master batch has good dyeing property and dispersibility and contains inorganic particles, and the size of the particles is preferably less than 1 micron or greater than 20 microns, so that the pore size of the expanded polypropylene bead is not greatly influenced, and thus the molding performance is not influenced.

One or more of hindered phenols, hindered amines, phosphite esters and the like are preferably mixed according to any proportion as the antioxidant. The antioxidant is preferably 1,3,5-trimethyl-2,4,6-tris(3,5-di-tert-butyl-4-hydroxybenzyl)benzene, and the addition amount is 0.01%-0.1%.

One or more of conductive carbon black, carbon nanotubes, metal nanoparticles, polyacetylene, polythiophene, polypyrrole, polyaniline, polyphenylene and the like are preferably selected as the conductive agent. The conductive carbon black is preferably selected based on comprehensive consideration from the aspects of cost, processing difficulty, conductivity and the like.

According to an embodiment of the present invention, the expanded polypropylene bead has a bulk density of 15-120 g/L, and an endothermic enthalpy value at a melting peak higher than an intrinsic melting point in a first DSC melting curve of the expanded polypropylene bead is 8-25 J/g, further preferably 10-18 J/g, most preferably 12-15 J/g.

The present invention further provides a preparation method for the expanded polypropylene bead as mentioned above, including the following steps:
(1) mixing polypropylene A, polypropylene B, polypropylene C, a thermal-conductive additive, an expansion additive, a pore nucleating agent and other additives, and performing extrusion granulation to prepare master batch of a core layer;
(2) mixing polypropylene D, polyolefin E and other additives, and performing extrusion granulation to obtain master batch of a skin layer;
(3) co-extruding the master batch of the core layer and the master batch of the skin layer to obtain composite particles with the skin layer covering the core layer; and
(4) performing high-temperature and high-pressure kettle type foaming treatment on the composite particles.

According to an embodiment of the present invention, in the preparation method, the high-temperature and high-pressure kettle type foaming treatment includes maintaining the composite particles, a dispersing agent and water under the conditions of foaming temperature and foaming pressure for a certain time, and then discharging generated material particles from a high-pressure kettle into a specific foaming pipeline for foaming and expanding, wherein air pressure in the foaming pipeline is lower than 0.1 MPa, the temperature of the atmosphere in the foaming pipeline is 80-100 DEG C, and the time of the material particles experiencing in the foaming pipeline is 4-15 s.

According to an embodiment of the present invention, the expanded polypropylene bead prepared according to the preparation method has a bulk density of 15-120 g/L, and an endothermic enthalpy value at a melting peak higher than an intrinsic melting point in a first DSC melting curve of the expanded polypropylene bead is 8-25 J/g, further preferably 10-18 J/g, most preferably 12-15 J/g.

Preferably, the preparation method for the expanded polypropylene bead includes:
(1) mixing polypropylene A, polypropylene B, polypropylene C, a thermal-conductive additive, an expansion additive, a pore nucleating agent and other additives, and performing extrusion granulation to prepare master batch of a core layer;
(2) mixing polypropylene D, polyolefin E and other additives, and performing extrusion granulation to obtain master batch of a skin layer;
(3) respectively adding the master batch of the core layer and the master batch of the skin layer into a core layer extruder and a skin layer extruder of a twin-screw and single-screw co-extrusion unit, after plasticization, simultaneously extruding and granulating through a co-extrusion exit mold to obtain composite particles with the skin layer covering the core layer; and
(4) adding the composite particles, a dispersing agent and water into a high-temperature and high-pressure reaction kettle, and meanwhile, adding the dispersing agent and a surfactant, such as butter, kaolin, alumina, sodium glycocholate, sodium lauryl sulfate, etc.

The reaction kettle is heated and a gaseous physical foaming agent, such as carbon dioxide, is introduced, so that the foaming agent gradually penetrates into the interiors of the composite particles to form a homogeneous system. When the reaction kettle reaches set temperature (120-160 DEG C) and set pressure (1-5 MPa), the reaction kettle is kept for 5-30 min, and then polypropylene particles are instantly released into a specific foaming pipeline for foaming and expansion, wherein the air pressure in the foaming pipeline is lower than 0.1 MPa, the temperature of the atmosphere in the foaming pipeline is 80-100 DEG C, and the time of the material particles experiencing in the foaming pipeline is 4-15 s. Under the action of a huge pressure difference, the foaming agent is instantly vaporized and separated from the polypropylene substrate, and enables the polypropylene particles to be expanded, thereby obtaining expanded polypropylene beads of a multi-layer structure. The expanded polypropylene bead has a bulk density of 15-120 g/L, and an endothermic enthalpy value at a melting peak higher than an intrinsic melting point in a first DSC melting curve of the expanded polypropylene beads is 8-25 J/g, further preferably 10-18 J/g, most preferably 12-15 J/g.

A melting peak of the intrinsic melting point is an endothermic peak in the DSC curve generated by melting of the polypropylene resin when the temperature is heated to 200 DEG C from room temperature at a heating speed of 10 c/min after thermal history has been eliminated. When the polypropylene particles are heated to high temperature (usually close to the melting point) in the reaction kettle, part of the originally frozen polypropylene molecular chains begin to move freely and be rearranged to form more perfect crystalline regions. Such crystalline region is more perfect than an inherent crystalline region of polypropylene, so that the heated polypropylene particles have higher melting temperature, and the melting peak higher than the intrinsic melting point is formed. After keeping the temperature consistent for a period of time, the polypropylene particles are depressurized for foaming, and the temperature is rapidly cooled. At this time, since the polypropylene molecular chains do not form perfect crystals, part of the molecular chains are cooled and crystallized during the cooling process, and a low-temperature peak with a melting point lower than the inherent melting point peak is formed.

The present invention further provides a molded part, which is obtained by performing steam sinter molding on the aforementioned expanded polypropylene bead or the expanded polypropylene bead obtained by the aforementioned preparation method, specifically including the following steps: loading pressure to the expanded beads via air, and then performing water vapor molding.

Preferably, the molding pressure of the aforementioned molded part is lower than 1.4 bar, the molded part can be molded on an EPS molding machine, and the surface quality of the molded part is excellent. The molded part has a density of 58-62 Kg/m$^3$ and a compressive stress at 50% strain of not less than 500 KPa.

The present invention has the beneficial effects as follows:

The EPP bead is prepared, and the EPP with high modulus and high expansibility under high thermal deformation temperature is provided. The product has a low molding pressure and a high compression strength without special treatment, has a wide molding window, and can be well applied to common EPS equipment. Moreover, the EPP bead can well solve the limitation on raw materials when a coating technology is used to produce the low-energy consumption EPP bead on the market, and are applicable to solving the problem of molding expansibility of high-melting-point and high-modulus polypropylene raw materials, so that the high degree of fusion and high product appearance quality can be obtained under the low molding pressure, and the problems that under the low molding pressure, although the products are fused, the surface quality is poor, and many pinhole pits exist are solved. The product is applicable to all expanded polypropylene raw materials, and has good molding expansibility so as to ensure that the product can be fully fused during low pressure molding. In addition, the prepared EPP bead has relatively good mechanical properties and heat-resistant stability.

The properties of main experimental materials are shown in Table 1.

TABLE 1

| Properties of main experimental materials | | | | |
|---|---|---|---|---|
| Name (category) | | Melting points (DEG C.) | Melt indexes (g/10 min) | Flexural moduli (MPa) |
| Polypropylene | A | 125 | 7 | 750 |
| Polypropylene | B | 135 | 7 | 1000 |
| Polypropylene | C | 150 | 14 | 1340 |
| Polyolefin resin | Polypropylene D | 126 | 7 | / |
| | LLDPE | 115 | 5 | / |
| | OBC (namely olefin block copolymer) | 118 | 6 | / |

Formulas and parameters of composite particles S1-S8 and composite particles D1-D8 are shown in Table 2 and Table 3.

TABLE 2

| Formulas and parameters of composite particles S1-S8 | | | | | | | | | | |
|---|---|---|---|---|---|---|---|---|---|---|
| | | Composite particles | | | | | | | | |
| Embodiments | | S1 | S2 | S3 | S4 | S5 | S6 | S7 | S8 | S9 |
| | | Proportioning of core layer (mass) | | | | | | | | |
| Polypropylene | A | 20 | 20 | 20 | 30 | 30 | 40 | 40 | 40 | 40 |
| Polypropylene | B | 60 | 60 | 60 | 50 | 50 | 40 | 40 | 40 | 40 |
| Polypropylene | C | 15 | 15 | 15 | 15 | 15 | 15 | 15 | 15 | 15 |
| Expansion additive | Aluminum potassium sulfate | 0.05 | 0.5 | 2 | 0.05 | 0.5 | 0.05 | 0.5 | 2 | 0.05 |
| Nucleating agent | Polytetrafluoroethylene | 0.02 | 0.02 | 0.02 | 0.02 | 0.02 | 0.02 | 0.02 | 0.02 | 0.02 |
| Thermal-conductive additive | | 2 | 2 | 2 | 2 | 2 | 2 | 2 | 2 | 2 |
| Polyolefin resin | Polypropylene D | 74 | 74 | 74 | 74 | 74 | 74 | 74 | 74 | 74 |
| | LLDPE | 25 | 25 | 25 | 25 | 25 | 25 | 25 | 25 | 0 |
| | OBC | 0 | 0 | 0 | 0 | 0 | 0 | 0 | 0 | 25 |

TABLE 3

| Formulas and parameters of composite particles D1-D8 | | | | | | | | | | |
|---|---|---|---|---|---|---|---|---|---|---|
| | | Composite particles | | | | | | | | |
| Comparative examples | | D1 | D2 | D3 | D4 | D5 | D6 | D7 | D8 | D9 |
| | | Proportioning of core layer (mass) | | | | | | | | |
| Polypropylene | A | 20 | 20 | 20 | 15 | 15 | 50 | 50 | 50 | 20 |
| Polypropylene | B | 60 | 60 | 60 | 65 | 65 | 30 | 40 | 40 | 60 |
| Polypropylene | C | 15 | 15 | 15 | 15 | 15 | 15 | 15 | 15 | 15 |
| Expansion additive | Aluminum potassium sulfate | 0.05 | 0.5 | 2 | 0.05 | 0.5 | 0.05 | 0.5 | 2 | 0.05 |
| Nucleating agent | Polytetrafluoroethylene | 0.02 | 0.02 | 0.02 | 0.02 | 0.02 | 0.02 | 0.02 | 0.02 | 0.02 |
| Thermal-conductive additive | | 2 | 2 | 2 | 2 | 2 | 2 | 2 | 2 | 2 |
| Polyolefin resin | Polypropylene D | 0 | 40 | 45 | 25 | 25 | 25 | 25 | 25 | 0 |
| | LLDPE | 99 | 59 | 54 | 74 | 74 | 74 | 74 | 74 | 0 |
| | OBC | 0 | 0 | 0 | 0 | 0 | 0 | 0 | 0 | 99 |

A preparation method for an expanded polypropylene bead includes:

(1) mixing polypropylene A, polypropylene B, polypropylene C, a thermal-conductive additive, an expansion additive, a pore nucleating agent and other additives, and performing extrusion granulation to prepare master batch of a core layer;

(2) mixing polypropylene D, polyolefin E and other additives, and performing extrusion granulation to obtain master batch of a skin layer;

(3) respectively adding the master batch of the core layer and the master batch of the skin layer into a core layer extruder and a skin layer extruder of a twin-screw and single-screw co-extrusion unit, after plasticization, simultaneously extruding and granulating through a co-extrusion exit mold to obtain composite particles with the skin layer covering the core layer; and (4) adding the composite particles, a dispersing agent and water into a high-temperature and high-pressure reaction kettle, and meanwhile, adding the dispersing agent and a surfactant, such as butter, kaolin, alumina, sodium glycocholate, sodium lauryl sulfate, etc.

The reaction kettle is heated and a gaseous physical foaming agent, such as carbon dioxide, is introduced, so that the foaming agent gradually penetrates into the interiors of the composite particles to form a homogeneous system. When the reaction kettle reaches set temperature (120-160 DEG C) and set pressure (1-5 MPa), the reaction kettle is kept for 5-30 min, and then polypropylene particles are instantly released into a specific foaming pipeline for foaming and expansion, wherein the air pressure in the foaming pipeline is lower than 0.1 MPa, the temperature of the atmosphere in the foaming pipeline is 80-100 DEG C, and the time of the material particles experiencing in the foaming pipeline is 4-15 s. Under the action of a huge pressure difference, the foaming agent is instantly vaporized and separated from the polypropylene substrate, and enables the polypropylene particles to be expanded, thereby obtaining expanded polypropylene beads of a multi-layer structure. The expanded polypropylene bead has a bulk density of 15-120 g/L, and an endothermic enthalpy value at a melting peak higher than an intrinsic melting point in a first DSC melting curve of the expanded polypropylene beads is 8-25 J/g, further preferably 10-18 J/g, most preferably 12-15 J/g.

A molded part obtained from the expanded polypropylene bead is obtained by performing steam sinter molding on the aforementioned expanded polypropylene bead, specifically including the following steps: loading pressure to the expanded beads via air, and then performing water vapor molding.

Parameters in preparation processes of Examples 1-9 and Comparative Examples 1-9 and properties of the molded parts are shown in Table 4 and Table 5, respectively.

TABLE 4

Parameters in preparation processes of Examples 1-9

| | Example | | | | | | | | |
|---|---|---|---|---|---|---|---|---|---|
| | 1 | 2 | 3 | 4 | 5 | 6 | 7 | 8 | 9 |
| | Composite particles | | | | | | | | |
| | S1 | S2 | S3 | S4 | S5 | S6 | S7 | S8 | S9 |
| Foaming temperature (DEG C.) | 128.8 | 127.5 | 129 | 126.5 | 126.3 | 125.9 | 126 | 125.8 | 126.1 |
| Foaming pressure (MPa) | 1.8 | 1.75 | 1.6 | 1.7 | 1.6 | 1.85 | 1.75 | 1.65 | 1.8 |
| Temperature of the atmosphere in the foaming pipeline (DEG C.) | 90 | 89 | 90 | 88 | 88 | 88 | 88 | 88 | 88 |
| Bulk densities of expanded beads (g/L) | 58 | 56.5 | 57.5 | 59 | 59.5 | 58.5 | 59 | 59.3 | 58.9 |
| Endothermic enthalpy values at the high-temperature melting peak (J/g) | 12.5 | 14.5 | 13 | 13.7 | 14 | 12.9 | 13.5 | 14.4 | 13.6 |
| Lowest molding pressure (bar) | 1.5 | 1.4 | 1.2 | 1.3 | 1.2 | 1.2 | 1.0 | 0.9 | 1.0 |
| Densities of molded parts (Kg/m$^3$) | 60 | 59 | 58.5 | 61.2 | 61.8 | 61 | 61.4 | 61.5 | 60.9 |
| Appearance quality of molded parts | iii | iii | iiii | iii | iiii | iiii | iiii | iiii | iiii |
| Compressive stress at 50% strain (KPa) | 540 | 534 | 535 | 522 | 519 | 520 | 522 | 512 | 524 |

TABLE 5

Parameters in preparation processes of Comparative Examples 1-9

| | Comparative Example | | | | | | | | |
|---|---|---|---|---|---|---|---|---|---|
| | 1 | 2 | 3 | 4 | 5 | 6 | 7 | 8 | 9 |
| | Composite particles | | | | | | | | |
| | D1 | D2 | D3 | D4 | D5 | D6 | D7 | D8 | D9 |
| Foaming temperature (DEG C.) | 128.7 | 127.5 | 128.8 | 126.4 | 126.3 | 125.8 | 126 | 125.7 | 128.3 |
| Foaming pressure (MPa) | 1.8 | 1.73 | 1.65 | 1.72 | 1.6 | 1.85 | 1.74 | 1.63 | 1.8 |
| Temperature of the atmosphere in the foaming pipeline (DEG C.) | 90 | 89 | 90 | 88 | 88 | 88 | 88 | 88 | 90 |
| Bulk densities of expanded beads (g/L) | 57 | 56.1 | 57.4 | 58.7 | 59.2 | 58.2 | 57.5 | 59.1 | 57.2 |
| Endothermic enthalpy values at the high-temperature melting peak (J/g) | 12.8 | 14.1 | 13 | 13.3 | 13.6 | 13.9 | 13.7 | 14.2 | 12.9 |
| Lowest molding pressure (bar) | 2.8 | 1.8 | 1.6 | 1.4 | 1.4 | 1.2 | 1.2 | 1.0 | 1.8 |
| Densities of molded parts (Kg/m$^3$) | 61.5 | 59.3 | 58.1 | 60.2 | 61.7 | 60 | 61.9 | 61.6 | 59.5 |
| Appearance quality of molded parts | iii | iiii | iiii | iii | iii | iiii | iiii | iiii | iiii |
| Compressive stress at 50% strain (KPa) | 541 | 524 | 535 | 512 | 511 | 478 | 492 | 502 | 544 |

The lowest molding pressure refers to the lowest steam sintering pressure required for the proportion of broken particles in a fracture surface of the expanded bead molded part to be greater than 95%.

The appearance quality of the part: "ii" indicates that there are many pits or gaps on the surface of the part; "iii" indicates there are a small number of pits or gaps on the surface of the workpiece; "iiii" indicates that there is no or very few pits or gaps on the surface of the part.

Figure 1:
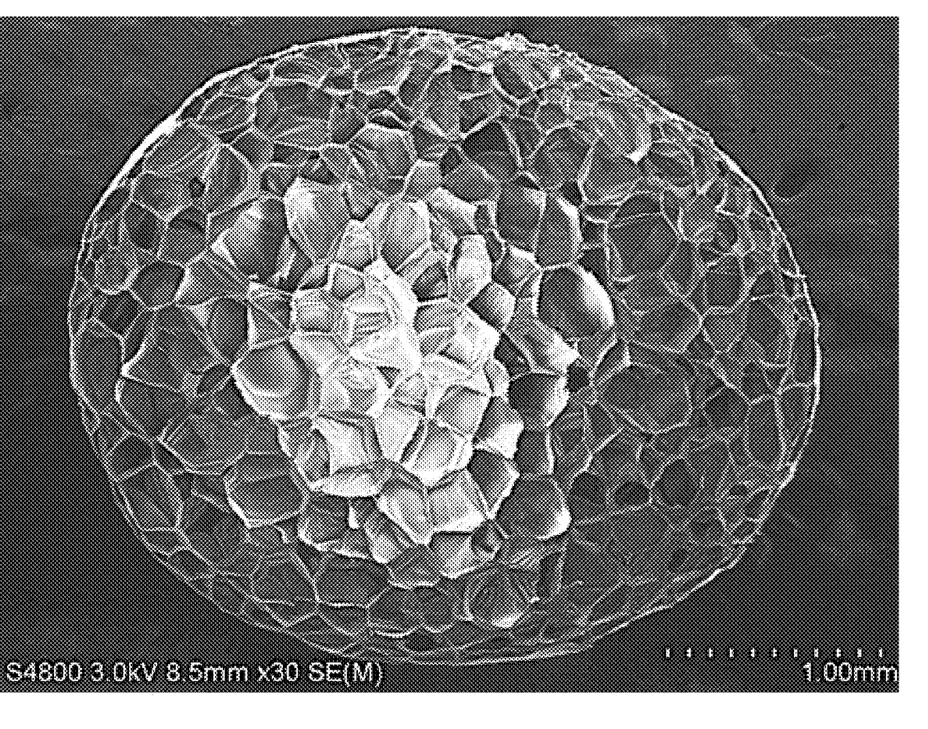
The single FIGURE is a scanning electron micrograph of a cross section of an expanded polypropylene bead prepared according to an embodiment of the present invention.

Examples 1 to 9 are all within the scope of technical requirements, showing excellent low-pressure moldability and compression resistance, and thus the molded part can be fully processed by EPS molding machines. The FIGURE is an SEM image of a cross section of the expanded bead of Embodiment 4. A uniform closed-pore structure can be observed, and the difference between pores in the central part of the bead and pores in the part near the surface layer is small, which is conducive to showing excellent molding expansibility.

In Comparative Example 1, the skin layer is all composed of crystalline polyolefin LLDPE, and thus the molding energy consumption is extremely high and the degree of curing of the interior is still lower than 40%. The main reason is that the melting point of LLDPE is low, so that the skin layer of the bead is melted instantly during steam molding, and then steam is prevented from entering the bead, resulting in the low degree of curing even under very high molding pressure. Therefore, different from Embodiment 1, the skin layer needs a certain proportion of polypropylene resin D.

Comparative Examples 2 and 3 show that the polypropylene D and LLDPE in the skin layer need to be kept within a certain range, otherwise the molding energy consumption will also be high, even with excellent product appearance and compression performance.

Comparative Examples 4 and 5 show that the lower limit content of metallocene polypropylene A in the core layer needs to be limited within a certain range to ensure the expansibility of the bead and directly affect the molding energy consumption of the bead.

Comparative Examples 6-8 show that the upper limit content of metallocene polypropylene A in the core layer also needs to be limited within a certain range, and thus the bead has low molding energy consumption and excellent appearance. But the melting point and flexural modulus of polypropylene A are relatively low, which indirectly leads to low compression performance of the molded part. A subsequent drying process requires the use of steam for a long time, which indirectly leads to an increase in energy consumption.

In Comparative Example 9, the skin layer is all composed of OBC, so that compared with the use of LLDPE, the use of OBC leads to lower molding energy consumption and better part appearance, reflecting the particularity of LLDPE and also showing that the content of polyolefin D must be kept within a certain range.

Although illustrative embodiments have been shown and described, it should be understood by those skilled in the art that the above-described embodiments are not to be construed as limitations of the present application, and changes, substitutions and modifications can be made in the embodiments without departing from the spirit, principles and scope of the present application.

What is claimed is:

1. An expanded polypropylene bead, comprising:
   a foamed core layer, and
   a foamed skin layer, the foamed skin layer covering the foamed core layer, wherein:
   the foamed core layer at least comprises the following components in percentage by mass:
      20-40% of polypropylene A, 60-80% of polypropylene B, 0-20% of polypropylene C and 0-10% of a thermal-conductive additive,
   the foamed skin layer at least comprises the following components in percentage by mass:

40-80% of polypropylene D and 20-60% of polyolefin E, and a weight ratio of the foamed skin layer to the foamed core layer is 1:99-10:90.

2. The expanded polypropylene bead according to claim 1, wherein the polypropylene A has a melting point of 120-130 DEG C, a melt index of 5-10 g/10 min, and/or a flexural modulus of 600-750 MPa, or the polypropylene A is a polypropylene random copolymer or a metallocene catalyst product which does not comprise a crystallization nucleating agent, an inorganic filler and a metal salt lubricant.

3. The expanded polypropylene bead according to claim 1, wherein the polypropylene B has a melting point of 132-148 DEG C, and/or a melt index of 5-10 g/10 min, or the polypropylene B is a polypropylene random copolymer having a flexural modulus of 850-1100 MPa.

4. The expanded polypropylene bead according to claim 1, wherein the polypropylene C has a melting point of 140-152 DEG C, and/or a melt index of 5-30 g/10 min, or the polypropylene C is polypropylene having a flexural modulus of 1200-1400 MPa.

5. The expanded polypropylene bead according to claim 1, wherein the polypropylene D is co-polypropylene having a melting point of 105-135 DEG C or 120-135 DEG C, and a melt index of 4-15 g/10 min.

6. The expanded polypropylene bead according to claim 1, wherein the polyolefin E has a melting point of 90-135 DEG C or 105-120 DEG C, and a melt index of 4-15 g/10 min.

7. The expanded polypropylene bead according to claim 1, wherein:
the thermal-conductive additive has a particle size that is 20 microns-50 microns, or an addition amount that is 0.5 wt %-5 wt %;
the foamed core layer further comprises an expansion additive with an addition amount that is 0.05 wt %-2 wt %; and
the foamed core layer further comprises a pore nucleating agent with a particle size that is 5 microns-15 microns, or an addition amount that is 0.02 wt %-0.2 wt %.

8. The expanded polypropylene bead according to claim 6, wherein the polyolefin E comprises LLDPE.

9. The expanded polypropylene bead according to claim 7, wherein:
the thermal-conductive additive comprises carbon nanotubes;
the foamed core layer comprises aluminum potassium sulfate, with said addition amount; and
the foamed core layer comprises polytetrafluoroethylene powder, with said particle size or said addition amount.

10. The expanded polypropylene bead according to claim 6, wherein the polyolefin E comprises one or more of LDPE, HDPE, POP, OBC, EVA, POE, EAA and EMA.

11. The expanded polypropylene bead according to claim 7, wherein the thermal-conductive additive comprises one or more of metal nanorods, graphene, aluminum oxide, silicon oxide, magnesium oxide and zinc oxide.

12. The expanded polypropylene bead according to claim 7, wherein the foamed core layer comprises one or more of polyvinyl alcohol and polyethylene glycol, with said addition amount.

13. The expanded polypropylene bead according to claim 7, wherein the foamed core layer comprises one or more of zinc borate, talcum powder, barium sulfate, calcium carbonate, calcium stearate and silicon dioxide, with said particle size or said additional amount.

14. A preparation method for the expanded polypropylene bead according to claim 1, comprising the following steps:
mixing polypropylene A, polypropylene B, polypropylene C, a thermal-conductive additive, an expansion additive, a pore nucleating agent and other additives, and performing extrusion granulation to prepare master batch of a core layer;
mixing polypropylene D, polyolefin E and other additives, and performing extrusion granulation to obtain master batch of a skin layer;
co-extruding the master batch of the core layer and the master batch of the skin layer to obtain composite particles with the skin layer covering the core layer; and
performing high-temperature and high-pressure kettle type foaming treatment on the composite particles.

15. The preparation method according to claim 14, wherein the high-temperature and high-pressure kettle type foaming treatment comprises keeping the composite particles, a dispersing agent and water under the conditions of foaming temperature and foaming pressure for a certain time, and then discharging generated material particles from a high-pressure kettle into a specific foaming pipeline for foaming and expanding, wherein air pressure in the foaming pipeline is lower than 0.1 MPa, the temperature of the atmosphere in the foaming pipeline is 80-100 DEG C, and the time of the material particles experiencing in the foaming pipeline is 4-15 s.

16. The preparation method according to claim 14, wherein the expanded polypropylene beads have a bulk density of 15-120 g/L, and an endothermic enthalpy value at a melting peak higher than an intrinsic melting point in a first DSC melting curve of the expanded polypropylene beads is 8-25 J/g or 10-18 J/g or 12-15 J/g.

17. A molded part obtained through steam sinter molding expanded polypropylene beads prepared according to claim 14, the molded part having a density of 58-62 Kg/m$^3$ and a compressive stress at 50% strain of not less than 500 KPa.

18. A molded part comprising expanded polypropylene beads according to claim 1, the molded part having a density of 58-62 Kg/m$^3$ and a compressive stress at 50% strain of not less than 500 KPa.

* * * * *